Aug. 28, 1928.
J. M. B. LEWIS
1,682,387
HEADLIGHT
Filed March 8, 1926
2 Sheets-Sheet 2
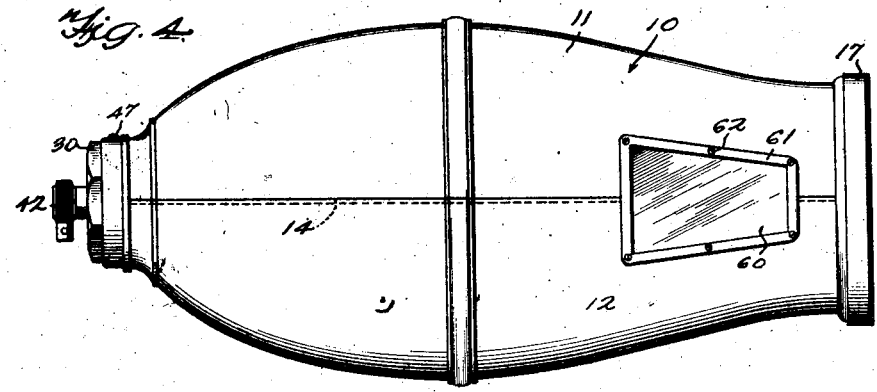
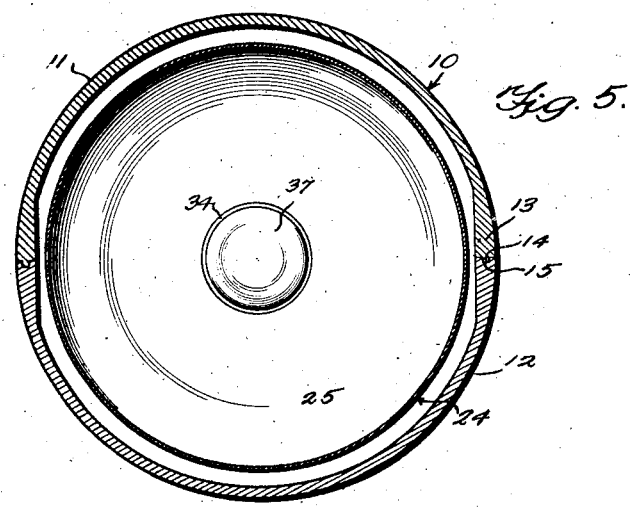
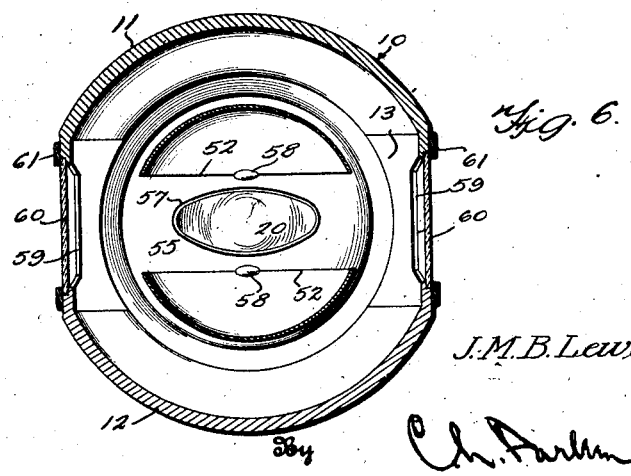
Inventor
J. M. B. Lewis Patented Aug. 28, 1928.

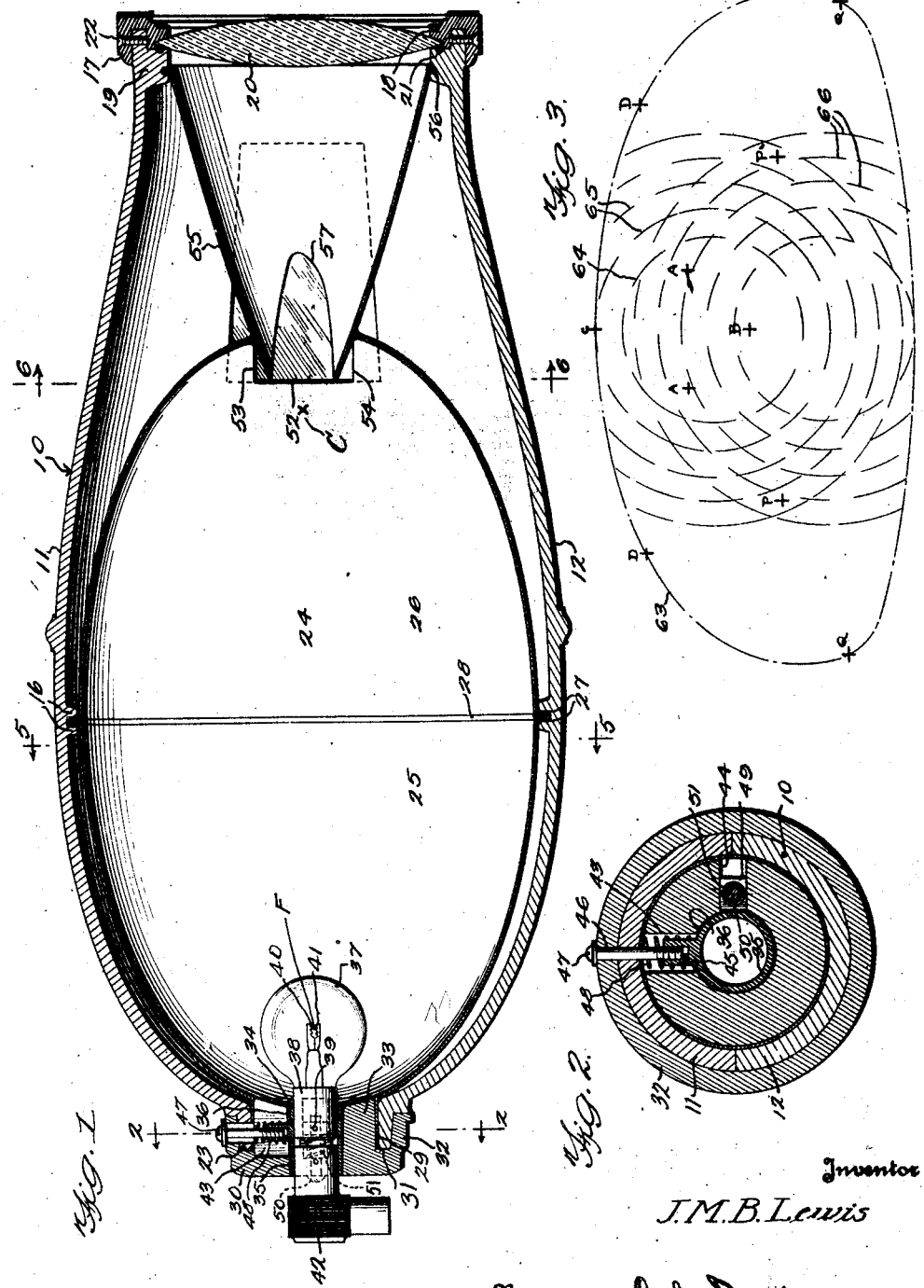

1,682,387

UNITED STATES PATENT OFFICE.

JOHN MINOR BOTTS LEWIS, OF LYNCHBURG, VIRGINIA.

HEADLIGHT.

Application filed March 8, 1926. Serial No. 93,254.

This invention relates to automobile headlights.

An important object of the invention is to provide a headlight particularly for use on automobiles, and adapted to project a brilliant beam of light on the road ahead of the vehicle, the beam being clearly defined and having a relatively sharp cut-off at its upper limit to prevent glare in the eyes of approaching drivers.

A further object is to provide a headlight wherein the more intense portion of the beam is near the upper limit thereof to provide a brilliant light at a considerable distance forwardly of the vehicle, the intensity of the light diminishing toward the lower limit of the beam to illuminate the road closer to the vehicle to permit the driver to clearly see ruts etc., in the road.

A further object is to provide means for lowering the intense portion of the beam when desired, as when passing over the brow of a hill, the beam as a whole being maintained in the same position regardless of the direction of projection of the more intense portion thereof.

A further object is to provide a headlight employing as its source of light a double filament bulb having one filament arranged at or slightly above the focus of the reflector and adapted to project a normal road light of the character referred to wherein the more intense portion of the beam is near the upper limit thereof, the lower filament being employed for changing the position of the more intense portion of the beam to the lower portion thereof without altering the position of the beam as a whole.

A further object is to provide a headlight employing an ellipsoidal reflector having principal and conjugate foci, an auxiliary reflector being arranged forwardly of the reflector and adapted to intercept widely diverging rays and redirect them in such a manner that they are utilized in building up the general intensity of the beam.

A further object is to provide a novel form of supporting means for the light source to permit it to be adjusted vertically and longitudinally to place the filaments of the bulb in the desired positions.

Other objects and advantages of the invention will become apparent during the course of the following description.

In the drawings I have shown one embodiment of the invention. In this showing:

Figure 1 is a central vertical sectional view through the headlight,

Figure 2 is a section on line 2—2 of Figure 1,

Figure 3 is a diagrammatic sectional view of the resultant beam, showing the distribution of the light intensity, Figure 4 is a side elevation of the headlight, Figure 5 is a transverse section on line 5—5 of Figure 1, and, Figure 6 is a similar view on line 6—6 of Figure 1.

Referring to the drawings the numeral 10 designates a casing as a whole comprising upper and lower sections 11 and 12 respectively. Adjacent their meeting edges the casing sections 11 and 12 are thickened as at 13, the lower edge of the upper section being provided with a tongue 14 adapted to be received in a groove 15 formed in the upper edge of the lower casing section. The connection between the casing sections may be of any desired form, however, and need not correspond to the specific form shown and described. The casing is provided intermediate its ends with a pair of internal annular shoulders 16 for a purpose to be described. Means is provided for securing the casing sections together at their forward ends and to support a lens therein. As shown, a ring 17 surrounds the casing at its forward end and is provided with a portion 18 projecting within the end of the casing. The casing is provided with an internal shoulder 19 arranged rearwardly of the portion 18 of the ring, and a lens 20 is arranged with its edges between the inwardly projecting portion 18 of the ring and the shoulder 19 of the casing. A packing ring 21 is preferably carried by the shoulder 19 and contacts with the lens, as shown. Screws 22 pass through the ring 17 and through the forward end of the casing to secure the ring to the casing, as will be apparent. The casing is provided at its rear end with a rearward axial extension 23 for a purpose to be described.

A reflector indicated as a whole by the numeral 24 is arranged within the casing and comprises sections 25 and 26 as clearly shown in Figure 1. The reflector 24 is preferably ellipsoidal in form having principal and conjugate foci near the rear and forward ends thereof respectively, the position of the conjugate focus being substantially at the point "C" indicated in Figure 1. The adjacent edges of the reflector sections are provided with annular flanges 27 between which is arranged a packing ring 28. The flanges 27 and ring 28 are adapted to be arranged between the internal shoulders 16 to be held in position thereby. The rear reflector section 25 is provided with an axial substantially cylindrical extension 29 which fits within the extension 23 of the casing, as shown in Figure 1.

The rear ends of the casing sections 11 and 12 are adapted to be secured together by a cap 30. This cap is provided with a recess 31 receiving the extensions 23 and 29 of the casing and reflector, the cap being provided with a portion 32 surrounding the extension 23. Inwardly of the extension 29 the cap 30 is provided with a substantially solid portion 33 snugly received in the extension 29 of the reflector. The forward end of the portion 33 of the cap is polished to a reflecting surface as at 34 and this surface forms a continuation of the surface of the rear reflector section 25.

A light supporting tube 35 is arranged in the cap, as shown in Figure 1. The cap is provided with an opening to receive the tube and the opening increases in height toward its forward end as indicated at 36. The width of the opening, however, corresponds throughout its length to the diameter of the tube 35. A bulb 37 is arranged in the reflector 25 and is provided with the usual base 38 having a pin 39 adapted to be received in the usual bayonet slot (not shown) in the tube 35. The bulb is of the double filament type and is provided with upper and lower filaments 40 and 41. The principal focus of the light converging reflector is approximately at the point F, and the two filaments of the bulb preferably are arranged respectively above and below the focus, as shown in Figure 1. A connecting plug 42 is secured in the rear end of the tube 35 to supply current to the filaments of the light in the usual manner.

The portion 33 of the cap 30 is provided with a longitudinal slot 43 in its upper portion and a horizontal slot 44 in its side portion as shown in Figures 1 and 2. The tube 35 is provided with a vertical internally threaded extension 45 which receives the lower end of a screw 46 having the usual screw head 47. The screw extends through the portion 32 of the cap, and through the extensions 23 and 29 of the casing and reflector respectively, the openings through which the stem of the screw extends being slightly elongated to permit the screw to move to a slight extent longitudinally with respect to the axis of the headlight, for a purpose which will become apparent. A coil spring 48 surrounds the screw and extension 45, the ends of the spring bearing against the tube 35 and the extension 29 of the reflector respectively. The tube 35 is further provided with an extension 49 arranged in the slot 44, and a screw 50 is threaded on this extension. A spring 51 surrounds the screw and contacts at opposite ends with the extension 49 and the rear portion of the cap to normally urge the extension 49 and tube 35 forwardly.

The forward end of the reflector section 26 is provided with an opening 52 as shown in Figures 1 and 6. The upper and lower edges 53 and 54 of the opening 52 are cut along planes approximately parallel to the axis of the reflector, as will be apparent, and the rear edges of the opening are preferably cut on a plane transverse to the axis of the reflector. A supplementary reflector 55 is mounted in the forward end of the casing. The reflector 55 is formed as a surface of revolution and approximates a hyperbola in form, the focus of this reflector, usually but not necessarily coinciding with the conjugate focus of the reflector 24. A packing ring 56 is mounted in a suitable recess in the casing shoulder 19 and contacts with the forward end of the supplementary reflector to properly support the latter and prevent rattling. The rear end of the supplementary reflector is provided with an elongated opening 57 cut in its sides, and the supplementary reflector is brazed or otherwise secured to the forward portion of the reflector section 26, as at 58. It will be apparent that the reflector 55 is rigidly connected to the reflector 24 and does not move with respect thereto.

Outwardly of the opening 57 of the supplementary reflector, the casing is provided on opposite sides with openings 59 covered by plates of glass 60 to form windows. A ring 61 is arranged over the outer edges of each glass 60 and is secured to the casing by screws 62.

The operation of the headlight is as follows:

The upper filament 40 of the bulb is preferably arranged a very slight distance above the principal focus of the reflector 24. In order to secure the proper position of the filaments of the bulb the screw 50 may be rotated to move the tube 35 along the axis of the reflector. The spring 51 normally urges the tube 35 forwardly, as will be apparent, but freely permits longitudinal movement of the tube when the screw 50 is rotated. As previously stated, the opening in the cap 30 in which the tube 35 is arranged increases in height toward its forward end as at 36. It will be apparent therefore that the bulb may be adjusted vertically by rotating the screw 46. The rear end of the opening in which the tube 35 is arranged is substantially circular so that there will be no vertical movement at this point. The forward end of the tube however, may move vertically within reasonable limits to permit vertical adjustment of the filament. The spring 48 normally urges the forward end of the tube 35 downwardly and it will be apparent that the forward end of the tube is adapted to move vertically when the screw 46 is rotated. When the filament 40 is arranged in the desired position, preferably slightly above the principal focus of the reflector 24, it will be apparent that the "hot spot" or more intense portion of the beam projected by the reflector 24 will lie slightly below the conjugate focus of the reflector and near the lower portion of the opening 57. In actual practice, the rearward focus of the lens, the focus of the reflector 55, and the conjugate focus of the reflector 24 are substantially coincident, but the results obtained by the structure as a whole can be varied by changing the relative positions of these theoretical points. It will be apparent therefore, that the lens is adapted to project an image of the opening 57 which will be more or less sharp depending upon the nearness of the various portions of the opening 57 to the plane of the rearward focus of the lens. With the filament adjusted in the manner described, it will be apparent that the more intense portion of the beam will lie near the top thereof since the image projected by the lens will be inverted. The more intense portion of the beam will be projected from the rear portions of the reflector 24 and will pass directly through the conjugate focus and to the lens 20 without being intercepted by any portion of the reflector 55. The portion of the beam thus formed obviously will be circular in cross section. The portions of the beam projected by the forward portion of the reflector 24 will diverge at considerable angles forwardly of the conjugate focus, and much of this light will be intercepted by the reflector 55. The supplementary reflector is preferably so designed that it will redirect in slightly diverging lines toward the lens, all the light intercepted by it. Thus the entire reflecting surface of the reflector 55 will be illuminated and a relatively sharp image of the opening 57 will be projected forwardly of the machine, this image obviously being the shape of the opening 57 inverted. The light which diverges horizontally at great angles beyond the conjugate focus will pass through the opening 57 of the supplementary reflector and outwardly through the windows in the sides of the casing, thus providing light for illuminating the sides of the road and for illuminating the sides of the vehicle, as will be apparent. This side light also assists the driver of a vehicle in reading signs along a road at night.

In Figure 3 of the drawings I have illustrated the distribution of the light of the beam diagrammatically. The general shape of the beam will be as indicated by the line 63 and only a very small amount of stray light will pass upwardly beyond the "C" and "D" points, as will be apparent. With the filament 40 arranged slightly above the principal focus, the more intense portion of the beam will lie within the ring indicated at 64, this intensity decreasing outwardly as indicated by the lines 65. Thus it will be apparent that adjacent the "A" and "B" points, an intense illumination is provided on the road at a substantial distance forwardly of the vehicle, sufficient light being provided adjacent the "P" and "Q" points for ordinary driving. It also will be apparent that while the intensity of the light diminishes outwardly in all directions from the circle 64, a considerable portion of light is provided on the road up to a point near the machine and the decrease in light intensity toward the machine substantially corresponds to the decrease in distance from the machine whereby driving conditions approaching daylight are provided, the road light being substantially even in intensity from a point close to the machine to a point several hundred feet away. The results above described are obtained when the focus of the reflector 55, the conjugate focus of the reflector 24 and the rearward focus of the lens are substantially coincident. The distribution of light, however, can be varied by changing the relative positions of the elements within reasonable limits. For instance, if it is found that there is too great an intensity of light at the "B" point, this intensity can be diminished and the light distributed to other points by arranging the reflector 55 slightly rearwardly of the position suggested. While the two reflectors are secured together, their fixed positions are determined according to the desired distribution of light.

At the present time there are two common methods of decreasing the intensity of headlights in the eyes of approaching drivers and also in decreasing the light adjacent the upper limit of the beams when passing over the brow of a hill. The commoner method is merely to dim the intensity of the light as a whole while it also has been proposed that double filament lights be employed, the lower filament projecting the normal upper driving beam while the upper filament is adapted to divert the entire beam downwardly. With the former method, insufficient road light is provided thus making it dangerous to pass vehicles at night, while with the latter method the downward bending of the light almost wholly eliminates distant road light, substantially all the light being projected on the road close to the vehicle. With the present construction the lower filament 41 may be illuminated, thus shifting the intense portion of the beam adjacent the conjugate focus to the upper portion of the beam, and this intense portion will be in the lower portion of the beam after the light passes through the lens 20 as will be apparent. The beam as a whole, however, will have a fixed position as indicated by the line 63, only the more intense portion of the light being diverted downwardly as indicated by the concentric circles 66. Obviously the intensity of the light diminishes outwardly from the innermost circle 66, but it has been found that sufficient light is maintained at distant points along the road to permit the driver to safely pass approaching vehicles. The present construction therefore provides a beam of fixed general position under all circumstances, but provides means whereby the intensity of the various portions of the beam may be varied according to driving conditions.

The opening within the reflector extension 29 is slightly greater than the diameter of the bulb 37, whereby it will be apparent that removal of the cap 30 permits removal of the bulb for replacement.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A device of the character described comprising a light converging reflector having principal and conjugate foci, a light bulb in said reflector, said bulb being provided with a pair of filaments approximating the principal focus of said reflector, said filaments being adapted to be selectively illuminated, a supplementary reflector arranged forwardly of the conjugate focus of said first named reflector and adapted to intercept light rays from the forward portion thereof and redirect them forwardly, said supplementary reflector being fixed against movement with respect to said first named reflector and provided in its rear end with an opening, and a condensing lens arranged in the path of rays from said reflectors, said lens having its rearward focus substantially coincident with said opening.

2. A device of the character described comprising a casing having an opening in its rear end, a light converging reflector arranged in said casing and having principal and conjugate foci, said reflector having a rearward extension snugly fitting within the opening in said casing and being provided within said extension with an opening, a light bulb insertable into said reflector through the opening therein, said bulb being provided with a pair of filaments approximating the principal focus of said reflector, said filaments being adapted to be selectively illuminated, a supplementary reflector arranged adjacent the forward end of said first named reflector, said supplementary reflector being provided in its rear end with an opening and being adapted to intercept rays from the forward portion of said first named reflector and redirect them forwardly, and a condensing lens arranged forwardly of said supplementary reflector and having its rearward focus substantially coincident with the opening therein.

3. A device of the character described comprising a light converging reflector having principal and conjugate foci, a light bulb arranged in said reflector provided with a pair of filaments approximating the principal focus of said reflector, said filaments being adapted to be selectively illuminated, a supplementary reflector formed as a surface of revolution arranged forwardly of the conjugate focus of said first named reflector and adapted to intercept light rays from the forward portion thereof and redirect them forwardly, said supplementary reflector being provided in its rear end with an opening adjacent the plane of the conjugate focus, and a condensing lens arranged in the path of rays from said reflectors and having its rearward focus substantially coincident with said opening.

4. A device of the character described comprising a light converging reflector having principal and conjugate foci, a light bulb in said reflector provided with a pair of filaments approximating the principal focus of said reflector, said filaments being adapted to be selectively illuminated, a supplementary reflector formed as a surface of revolution arranged forwardly of the conjugate focus of said first named reflector and adapted to intercept light rays from the forward portion thereof and redirect them forwardly, said supplementary reflector being provided in its rear end with an opening adjacent the conjugate focal plane, said opening being relatively restricted vertically and elongated horizontally, and a condensing lens arranged in the path of rays from said reflector and having its rearward focus substantially coincident with said opening.

5. A device of the character described comprising a light converging reflector having principal and conjugate foci, a light bulb in said reflector provided with a pair of filaments arranged respectively above and below the principal focus of said reflector and adjacent thereto, said filaments being adapted to be selectively illuminated, a supplementary reflector arranged forwardly of the conjugate focus of said first named reflector and adapted to intercept light rays from the forward portion thereof and redirect them forwardly, said supplementary reflector being provided in its rear end with an opening adjacent the conjugate focal plane, and a condensing lens arranged in the path of rays from said reflectors and having its rearward focus substantially coincident with said opening.

In testimony whereof I affix my signature.

JOHN MINOR BOTTS LEWIS.